United States Patent [19]
Kobayashi

[11] Patent Number: 5,754,347
[45] Date of Patent: May 19, 1998

[54] PHOTOGRAPHIC LENS SYSTEM

[75] Inventor: Yuko Kobayashi, Hachioji, Japan

[73] Assignee: Olympus Optical Co., Ltd., Tokyo, Japan

[21] Appl. No.: 746,385

[22] Filed: Nov. 8, 1996

[30] Foreign Application Priority Data

Nov. 10, 1995 [JP] Japan .................. 7-315843

[51] Int. Cl.$^6$ ........................................... G02B 9/14
[52] U.S. Cl. .............................................. 359/790
[58] Field of Search ................................ 359/790

[56] References Cited

U.S. PATENT DOCUMENTS 3,784,287  1/1974  Grey ........................................ 359/790
4,787,724  11/1988  Kudo et al. ............................. 359/790

FOREIGN PATENT DOCUMENTS 61-272710  12/1986  Japan .
62-183420  8/1987  Japan .

*Primary Examiner*—David C. Nelms
*Assistant Examiner*—Evelyn A. Lester
*Attorney, Agent, or Firm*—Cushman Darby & Cushman IP Group of Pillsbury Madison & Sutro LLP

[57] ABSTRACT

A photographic lens system for compact cameras comprising in order from the object side: a first positive meniscus lens element having a convex surface on the object side; a second biconcave lens element; a third biconvex lens element; and a stop, wherein at least two lens element including the first lens element have refractive indices not exceeding 1.6. This photographic lens system is configured so as to be manufactured at a low cost and exhibit high optical performance by selecting an adequate focal length for the third lens element.

7 Claims, 1 Drawing Sheet

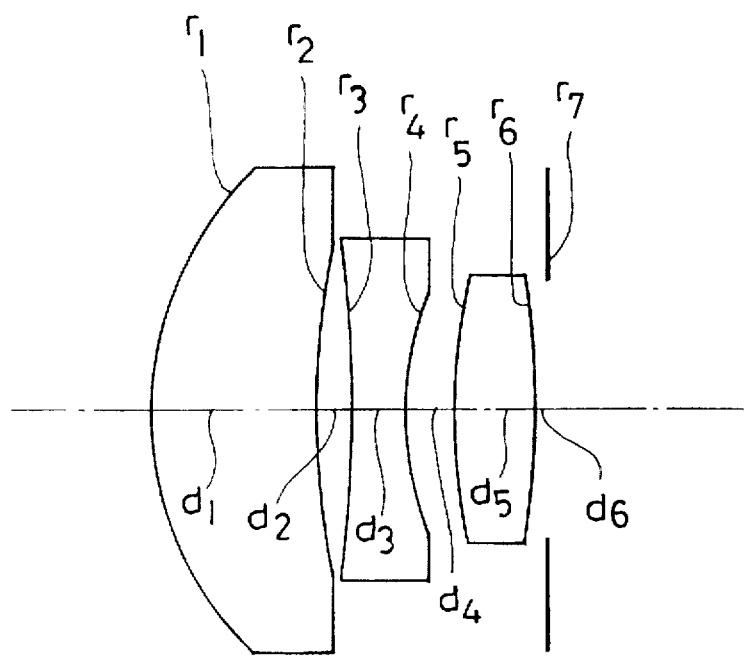

PHOTOGRAPHIC LENS SYSTEM

BACKGROUND OF THE INVENTION

1. Field of the Invention

The present invention relates to an inexpensive photographic lens system which is composed of three lens components of three lens elements (triplet type).

2. Description of the Prior Art

Since lens systems composed of three lens components of three lens elements (the triplet type) are compact and have relatively high optical performance, numerous triplet type lens systems have conventionally been used for lens shutter cameras.

In the recent years, where prices of a variety of products have decreased, however, it is also required to offer camera products at lower prices. Further, under the present circumstances where panoramic photographs prevail, it is desired to widen field angles of photographic lens systems.

Prior art triplet type photographic lens systems, designed in particular for lowering manufacturing costs, are photographic lens systems disclosed by Japanese Patent Kokai Publication No. Sho 61-272710 and U.S. Pat. No. 3,784,287.

Due to inadequate power distributions among lens elements, these conventional photographic lens systems are incapable of correcting offaxial aberrations sufficiently favorably and hardly allow field angles thereof to be widened, thereby having narrow half field angles on the order of 27°.

Further, a lens system disclosed by Japanese Patent Kokai Publication No. Sho 62-183420 is known as another conventional example of a photographic lens system. This conventional example has a wide field angle, on the order of 60° to 64°, but uses a glass material having a high refractive index for a front lens element, which has the largest diameter, thereby being insufficient from a viewpoint of low manufacturing cost.

SUMMARY OF THE INVENTION

A primary object of the present invention is to provide a compact photographic lens system for compact cameras which is remarkably inexpensive, and has aberrations corrected with good balance and favorable optical performance.

The photographic lens system according to the present invention is of the triplet type which is composed, in order from the object side, of a first positive meniscus lens element having a convex surface on the object side, a second biconcave lens element, a third biconvex lens element and a stop; and characterized in that at least two lens elements including the first lens element have refractive indices not exceeding 1.6, and the third lens element is configured so as to satisfy the following conditions (1) and (2):

$$0.20 < f_3/f < 0.45 \quad (1)$$

$$0.24 < r_5/f < 0.45 \quad (2)$$

BRIEF DESCRIPTION OF THE DRAWINGS

FIG. 1 shows a sectional view illustrating a composition of the photographic lens system according to the present invention.

DETAILED DESCRIPTION OF THE PREFERRED EMBODIMENTS

The triplet photographic lens system according to the present invention is composed, in order from the object side, of a first positive meniscus lens element having a convex surface on the object side, a second biconcave lens element, a third biconvex lens element and a stop; and characterized in that at least two lens elements including the first lens element have refractive indices not exceeding 1.6, and the third lens element is configured so as to satisfy the following conditions (1) and (2):

$$0.20 < f_3/f < 0.45 \quad (1)$$

$$0.24 < r_5/f < 0.45 \quad (2)$$

wherein the reference symbol $f_3$ represents a focal length of the third lens element, the reference symbol $r_5$ designates a radius of curvature on an object side surface of the third lens element and the reference symbol $f$ denotes a focal length of the photographic lens system as a whole.

For obtaining high optical performance, triplet type lens systems are generally made from materials having relatively high refractive indices for the first lens elements which have the largest outside diameters and occupy large volumetric spaces in the lens systems. Manufacturing costs of the lens systems are enhanced due to the fact that such expensive materials having the high refractive indices are selected for the first lens elements which have relatively large volumes. The triplet photographic lens system according to the present invention is made from an inexpensive material which has a low refractive index including the first lens element, so that the photographic lens system can be manufactured at a low cost. Further, a material having a low refractive index is also selected for the second or third lens elements for further lowering the manufacturing cost of the photographic lens system according to the present invention.

From a viewpoint of optical performance of the photographic lens system, however, it is undesirable to select a material having a low refractive index for the first lens element and the second lens element or the third lens element. In other words, Petzval's sum is enlarged and an offaxial image surface is apt to be tilted toward the object side when a lens system is composed of lens elements which are made of materials having low refractive indices as described above. The photographic lens system according to the present invention is configured so as to correct curvature of the offaxial image surface and spherical aberration with good balance, or maintain stable aberrations over an entire range from a center to a marginal portion, by selecting an adequate radius of curvature and an adequate refractive power for an object side surface of the third positive lens element.

The condition (1) defines a refractive power of the third positive lens element. If the upper limit of 0.45 of the condition (1) is exceeded, the third lens element will produce spherical aberration in too small an amount, thereby making it impossible to correct both spherical aberration and curvature of the offaxial image surface with good balance in the photographic lens system as a whole. In other words, it will be impossible to make an optimum central image surface coincident with an optimum offaxial image surface. If the lower limit of 0.20 of the condition (1) is exceeded, the third lens element will produce remarkably undercorrected spherical aberration, thereby making it impossible to make the optimum central image surface coincident with the optimum offaxial image surface as in the case where the upper limit of the condition (1) is exceeded. Further, a rear principal point of the lens system will be brought nearer a film (image plane), thereby undesirably tending to increase the total length of the lens system.

The condition (2) defines a radius of curvature on the object side surface of the third positive lens element. If the upper limit of 0.45 of the condition (2) is exceeded, a Petzval's sum will be enlarged and curvature of the offaxial image surface will be undercorrected, thereby disabling the lens system from making the optimum central image surface coincident with the optimum offaxial image surface. Further, the rear principal point will be brought nearer the image plane, thereby undesirably tending to increase the total length of the lens system.

If the lower limit of 0.24 of the condition (2) is exceeded, the object side surface of the third positive lens element will produce spherical aberration in an amount too large for favorable correction. Further, offaxial coma will be unbalanced, thereby making it difficult to maintain favorable optical performance for offaxial rays.

For stabilizing optical performance and lowering manufacturing cost of the photographic lens system for compact cameras according to the present invention, which has the fundamental composition described above, it is desirable to compose the lens system as described below. That is to say, at least two lens elements including the negative lens element are made of a synthetic resin material without modifying the fundamental composition of the photographic lens system. This is a requisite for offering a photographic lens system for cameras at a lower price and a low material cost is sufficient for the photographic lens system according to the present invention even when it uses a glass material having a low refractive index. However, not only the material cost but also labor cost is remarkably lowered by molding the lens elements with synthetic resin for mass production without modifying the fundamental composition of the photographic lens system according to the present invention.

It is possible and desirable to reduce displacement of image surfaces due to variations of temperature and humidity by selecting a synthetic resin material for at least two lens elements including the negative lens element.

It is possible to offer the photographic lens system according to the present invention at a lower price when all the lens elements are made of synthetic resin materials.

Acrylic resin, polycarbonate and other materials for plastic lens elements are usable as the synthetic resin materials.

Further, optical performance of the photographic lens system according to the present invention can be improved by using at least one aspherical surface.

Use of at least one aspherical surface is a requisite for obtaining a photographic lens system for cameras having stable optical performance. Even when the photographic lens system according to the present invention is composed only of spherical lens elements without using an aspherical surface, it is capable of correcting axial and offaxial aberrations with good balance, or has stable optical performance. By using at least one aspherical surface in the fundamental composition of the photographic lens system according to the present invention, however, it is possible to erect the offaxial image surface, thereby remarkably improving imaging performance for axial and offaxial rays. It is possible to correct not only curvature of the offaxial image surface but also offaxial coma with good balance by using an aspherical surface as the first surface in particular.

Furthermore, it is desirable to configure the first lens element so as to satisfy the following condition (3):

$$0.37 < (r_2 - r_1)/(r_2 + r_1) < 0.65 \qquad (3)$$

wherein the reference symbols $r_1$ and $r_2$ represent radii of curvature on an object side surface and an image side surface of the first lens element.

The condition (3) defines a shape of the first positive lens element. If the upper limit of 0.65 of the condition (3) is exceeded, the first lens element will have a strong refractive power, thereby making it necessary to thicken the first lens element for reserving required marginal thickness thereof. This undesirably leads to enlargement of the lens elements including the front lens element. If the lower limit of 0.37 of the condition (3) is exceeded, spherical aberration will be remarkably under-corrected, thereby undesirably disabling the lens system from making the optimum central image surface coincident with the optimum offaxial image surface. Further, offaxial coma will be aggravated, thereby making it difficult to maintain favorable optical performance.

Further, it is desirable that the third positive lens element satisfies the following condition (4):

$$1.50 < n_3 < 1.70 \qquad (4)$$

wherein the reference symbol $n_3$ represents a refractive index of the third positive lens element.

If the upper limit of 1.70 of the condition (4) is exceeded, the third lens element will have a refractive index which is effective for correcting a Petzval's sum but disadvantageous for lowering a material cost thereof. If the lower limit of 1.50 of the condition (4) is exceeded, a Petzval's sum will be large, thereby undesirably enlarging a deviation of the offaxial image surface which is disadvantageous for enhancing optical performance for offaxial rays.

It is more desirable that the triplet photographic lens system according to the present invention satisfies, in place of the conditions (1) and (2), the following conditions (5) and (6):

$$0.33 < f_3/f < 0.45 \qquad (5)$$

$$0.24 < r_5/f < 0.41 \qquad (6)$$

If the upper limit of 0.45 of the condition (5) is exceeded, spherical aberration will be small. If the lower limit of 0.33 of the condition (5) is exceeded, spherical aberration will be undercorrected, thereby making it more disadvantageous to correct spherical aberration over an entire range from a center to a marginal portion.

If the upper limit of 0.41 of the condition (6) is exceeded, offaxial curvature will be remarkable. If the lower limit of 0.24 of the condition (6) is exceeded, spherical aberration will be undercorrected, thereby making it more disadvantageous to correct spherical aberration over the entire range from the center to the marginal portion.

Preferred embodiments of the photographic lens system according to the present invention described above have numerical data which is listed below:

| First embodiment $f = 100, F/5.8, \omega = 33.4°$ | | | |
|---|---|---|---|
| $r_1 =$ | 20.1244 | | |
| | $d_1 = 9.1952$ | $n_1 = 1.49241$ | $\nu_1 = 57.66$ |
| $r_2 =$ | 47.1709 | | |
| | $d_2 = 1.9780$ | | |
| $r_3 =$ | −87.9362 | | |
| | $d_3 = 3.0431$ | $n_2 = 1.58362$ | $\nu_2 = 30.37$ |
| $r_4 =$ | 20.2106 | | |
| | $d_4 = 2.7388$ | | |
| $r_5 =$ | 35.5005 | | |
| | $d_5 = 4.7777$ | $n_3 = 1.58362$ | $\nu_3 = 30.37$ |
| $r_6 =$ | −52.8581 | | |

-continued $d_6 = 0.6086$
$r_7 = \infty$ (stop)
$f_3/f = 0.37$, $r_5/f = 0.36$
$(r_2 - r_1)/(r_2 + r_1) = 0.40$, $n_3 = 1.584$

Second embodiment
$f = 100$, F/5.8, $\omega = 32.5°$

| | | | |
|---|---|---|---|
| $r_1 =$ | 21.0114 (aspherical surface) | | |
| | $d_1 = 11.6606$ | $n_1 = 1.49241$ | $v_1 = 57.66$ |
| $r_2 =$ | 61.8818 | | |
| | $d_2 = 2.4005$ | | |
| $r_3 =$ | −101.3597 | | |
| | $d_3 = 3.6930$ | $n_2 = 1.58423$ | $v_2 = 30.49$ |
| $r_4 =$ | 18.7807 | | |
| | $d_4 = 3.0100$ | | |
| $r_5 =$ | 31.9890 | | |
| | $d_5 = 6.0814$ | $n_3 = 1.58423$ | $v_3 = 30.49$ |
| $r_6 =$ | −68.4244 | | |
| | $d_6 = 0.7386$ | | |
| $r_7 =$ | $\infty$ (stop) | | | aspherical surface coefficients $P = 1$, $E = 0.32882 \times 10^{-6}$, $F = -0.13837 \times 10^{-7}$,
$G = 0.13321 \times 10^{-9}$, $H = -0.61251 \times 10^{-12}$,
$I = 0.12527 \times 10^{-14}$
$f_3/f = 0.38$, $r_5/f = 0.32$
$(r_2 - r_1)/(r_2 + r_1) = 0.49$, $n_3 = 1.584$

Third embodiment
$f = 100$, F/5.8, $\omega = 33.3°$

| | | | |
|---|---|---|---|
| $r_1 =$ | 21.7536 | | |
| | $d_1 = 11.0691$ | $n_1 = 1.49241$ | $v_1 = 57.66$ |
| $r_2 =$ | 70.3073 | | |
| | $d_2 = 2.0352$ | | |
| $r_3 =$ | −84.4990 (aspherical surface) | | |
| | $d_3 = 3.0377$ | $n_2 = 1.58362$ | $v_2 = 30.37$ |
| $r_4 =$ | 21.1325 | | |
| | $d_4 = 3.2221$ | | |
| $r_5 =$ | 39.0913 | | |
| | $d_5 = 4.7084$ | $n_3 = 1.58362$ | $v_3 = 30.37$ |
| $r_6 =$ | −58.1290 | | |
| | $d_6 = 0.6075$ | | |
| $r_7 =$ | $\infty$ (stop) | | | aspherical surface coefficients $P = 1$, $E = 0.16858 \times 10^{-5}$, $F = -0.63629 \times 10^{-7}$,
$G = 0.13010 \times 10^{-8}$, $H = -0.10392 \times 10^{-10}$,
$I = 0.31090 \times 10^{-13}$
$f_3/f = 0.41$, $r_5/f = 0.39$
$(r_2 - r_1)/(r_2 + r_1) = 0.53$, $N_3 = 1.58$

Fourth embodiment
$f = 100$, F/4.66, $\omega = 33.3°$

| | | | |
|---|---|---|---|
| $r_1 =$ | 20.9732 (aspherical surface) | | |
| | $d_1 = 10.5158$ | $n_1 = 1.49241$ | $v_1 = 57.66$ |
| $r_2 =$ | 68.7688 | | |
| | $d_2 = 2.1883$ | | |
| $r_3 =$ | −74.3853 | | |
| | $d_3 = 3.0392$ | $n_2 = 1.58362$ | $v_2 = 30.37$ |
| $r_4 =$ | 19.9495 | | |
| | $d_4 = 2.8569$ | | |
| $r_5 =$ | 35.6138 | | |
| | $d_5 = 4.7108$ | $n_3 = 1.58362$ | $v_3 = 30.37$ |
| $r_6 =$ | −57.2167 | | |
| | $d_6 = 0.6078$ | | |
| $r_7 =$ | $\infty$ (stop) | | | aspherical surface coefficients $P = 1$, $E = 0.47667 \times 10^{-6}$, $F = -0.81115 \times 10^{-9}$,
$G = 0.64357 \times 10^{-10}$, $H = -0.39913 \times 10^{-12}$,
$I = 0.14768 \times 10^{-14}$
$f_3/f = 0.38$, $r_5/f = 0.36$
$(r_2 - r_1)/(r_2 + r_1) = 0.53$, $n_3 = 1.58$

Fifth embodiment
$f = 100$, F/4.5, $\omega = 32.6°$

| | | | |
|---|---|---|---|
| $r_1 =$ | 21.7105 (aspherical surface) | | |
| | $d_1 = 11.2838$ | $n_1 = 1.49241$ | $v_1 = 57.66$ |
| $r_2 =$ | 55.3359 | | |
| | $d_2 = 2.6538$ | | |
| $r_3 =$ | −81.9208 | | |
| | $d_3 = 3.7016$ | $n_2 = 1.58423$ | $v_2 = 30.49$ |
| $r_4 =$ | 20.4114 | | |
| | $d_4 = 2.5953$ | | |
| $r_5 =$ | 35.2038 | | |
| | $d_5 = 6.3816$ | $n_3 = 1.67270$ | $v_3 = 32.10$ |
| $r_6 =$ | −75.6366 | | |
| | $d_6 = 0.7403$ | | |
| $r_7 =$ | $\infty$ (stop) | | | aspherical surface coefficients $P = 1$, $E = 0.91618 \times 10^{-6}$, $F = -0.16942 \times 10^{-7}$,
$G = 0.17750 \times 10^{-9}$, $H = -0.71674 \times 10^{-12}$,
$I = 0.13661 \times 10^{-14}$
$f_3/f = 0.37$, $r_5/f = 0.35$
$(r_2 - r_1)/(r_2 + r_1) = 0.44$, $N_3 = 1.673$

Sixth embodiment
$f = 100$, F/5.68, $\omega = 33.6°$

| | | | |
|---|---|---|---|
| $r_1 =$ | 20.6104 (aspherical surface) | | |
| | $d_1 = 11.8193$ | $n_1 = 1.49241$ | $v_1 = 57.66$ |
| $r_2 =$ | 54.1333 | | |
| | $d_2 = 2.3829$ | | |
| $r_3 =$ | −126.3990 | | |
| | $d_3 = 3.8433$ | $n_2 = 1.58423$ | $v2 = 30.49$ |
| $r_4 =$ | 17.9080 | | |
| | $d_4 = 2.5866$ | | |
| $r_5 =$ | 28.8488 | | |
| | $d_5 = 7.4290$ | $n_3 = 1.58423$ | $v_3 = 30.49$ |
| $r_6 =$ | −77.8171 | | |
| | $d_6 = 0.7687$ | | |
| $r_7 =$ | $\infty$ (stop) | | | aspherical surface coefficients $P = 1$, $E = -0.33940 \times 10^{-7}$, $F = -0.13448 \times 10^{-7}$,
$G = 0.13302 \times 10^{-9}$, $H = -0.62906 \times 10^{-12}$,
$I = 0.12176 \times 10^{-14}$
$f_3/f = 0.37$, $r_5/f = 0.29$
$(r_2 - r_1)/(r_2 + r_1) = 0.45$, $n_3 = 1.58$

Seventh embodiment
$f = 100$, F/5.5, $\omega = 33.3°$

| | | | |
|---|---|---|---|
| $r_1 =$ | 20.7278 | | |
| | $d_1 = 10.7959$ | $n_1 = 1.49241$ | $v_1 = 57.66$ |
| $r_2 =$ | 60.2199 (aspherical surface) | | |
| | $d_2 = 2.3604$ | | |
| $r_3 =$ | −117.9874 | | |
| | $d_3 = 3.8071$ | $n_2 = 1.58423$ | $v_2 = 30.49$ |
| $r_4 =$ | 18.9926 | | |
| | $d_4 = 3.6847$ | | |
| $r_5 =$ | 34.8083 | | |
| | $d_5 = 6.8565$ | $n_3 = 1.58423$ | $v_3 = 30.49$ |
| $r_6 =$ | −66.4539 | | |
| | $d_6 = 0.7614$ | | |
| $r_7 =$ | $\infty$ (stop) | | | aspherical surface coefficients $P = 1$, $E = 0.28946 \times 10^{-5}$, $F = -0.51535 \times 10^{-7}$,
$G = 0.68689 \times 10^{-9}$, $H = -0.48895 \times 10^{-11}$,
$I = 0.11765 \times 10^{-13}$
$f_3/f = 0.40$, $r_5/f = 0.35$
$(r_2 - r_1)/(r_2 + r_1) = 0.49$, $n_3 = 1.58$

Eighth embodiment
$f = 100$, F/4.68, $\omega = 29.5°$

| | | | |
|---|---|---|---|
| $r_1=$ | 21.1529 (aspherical surface) | | |
| | $d_1 = 11.6159$ | $n_1 = 1.49241$ | $v_1 = 57.66$ |
| $r_2 =$ | 78.5132 | | |
| | $d_2 = 2.2529$ | | |
| $r_3 =$ | −78.4187 | | |

-continued

| | | | |
|---|---|---|---|
| | $d_3 = 3.4552$ | $n_2 = 1.58423$ | $v_2 = 30.49$ |
| $r_4 =$ | 19.5410 (aspherical surface) | | |
| | $d_4 = 2.9318$ | | |
| $r_5 =$ | 32.5892 | | |
| | $d_5 = 6.1552$ | $n_3 = 1.58423$ | $v_3 = 30.49$ |
| $r_6 =$ | −73.1826 | | |
| | $d_6 = 0.6910$ | | |
| $r_7 =$ | ∞ (stop) | | | aspherical surface coefficients
(1st surface)

$P = 1, E = -0.47627 \times 10^{-6}, F = 0.11484 \times 10^{-7},$
$G = 0.51955 \times 10^{-11}, H = -0.34233 \times 10^{-12},$
$I = 0.16985 \times 10^{-14}$ (4th surface)

$P = 1, E = 0.16966 \times 10^{-5}, F = -0.17162 \times 10^{-6},$
$G = 0.56388 \times 10^{-8}, H = -0.64267 \times 10^{-10},$
$I = 0.27802 \times 10^{-12}$
$f_3/f = 0.39, r_5/f = 0.33$
$(r_2 - r_1)/(r_2 + r_1) = 0.58, n_3 = 1.58$ wherein the reference symbols $r_1, r_2, \ldots$ represent radii of curvature on surfaces of respective lens elements, the reference symbols $d_1, d_2, \ldots$ designate thicknesses of the respective lens elements and airspace reserved therebetween, the reference symbols $n_1, n_2, \ldots$ denote refractive indices of the respective lens elements, and the reference symbols $\sigma_1, \sigma_2, \ldots$ represent Abbe's numbers of the respective lens elements.

Each of the first through eighth embodiments is an inexpensive photographic lens system for compact cameras which has half a field angle of approximately 30° to 34° and an F number on the order of 4.5 to 5.8.

Each of these embodiments has a composition illustrated in FIG. 1, wherein the photographic lens system is composed, in order from the object side, of a first positive meniscus lens element having a convex surface on the object side, a second biconcave lens element, a third biconvex lens element and a stop; at least two lens elements including the first lens element have maximum refractive indices of 1.6; and an object side surface of the third positive lens element has a radius of curvature and a refractive power which satisfy the conditions (1) and (2), whereby the photographic lens system exhibits stable optical performance for axial rays and offaxial rays by correcting curvature of the offaxial image surface and spherical aberration with good balance.

Out of the embodiments described above, all the lens elements are made of synthetic resin materials in the first through fourth and the sixth through eighth embodiments. The fifth embodiment is an example wherein the third lens element is made of a glass material for improving optical performance of the photographic lens system.

Further, the triplet lens system preferred as the first embodiment is composed only of spherical lens elements and is configured as an inexpensive photographic lens system for cameras which exhibits optical performance balanced well for axial rays and offaxial rays.

Each of the second and fourth through sixth embodiments uses an aspherical surface as the first surface, whereas the third embodiment uses an aspherical surface as the third surface and the seventh embodiment adopts an aspherical surface as the second surface. Further, aspherical surfaces are used as the first and fourth surfaces in the eighth embodiment. The aspherical surfaces are used as described above for improving optical performance of the photographic lens systems preferred as the embodiment of the photographic lens system according to the present invention. The aspherical surfaces used in the preferred embodiments have shapes which are expressed by the formula shown below:

$$x = \frac{y^2/r}{1+\sqrt{1-P(y/r)^2}} + Ey^4 + Fy^6 + Gy^8 + Hy^{10} + Iy^{12}$$

wherein the reference symbol x represents a distance measured in a direction along an optical axis, the reference symbol y designates a distance as measured from the optical axis, the reference symbol r denotes a radius of curvature on a vertex of an aspherical surface of interest, and the reference symbols P, E, F, G, H and I represent aspherical surface coefficients.

The photographic lens system according to the present invention can be manufactured at a low cost using inexpensive glass or plastic materials and is capable of correcting aberrations with good balance, thereby exhibiting optical performance required and favorable for low-priced photographic cameras.

I claim:

1. A photographic lens system comprising in order from the object side:

a first lens element which is a positive meniscus lens element having a convex surface on the object side;

a second lens element which is a biconcave lens element;

a third lens element which is a biconvex lens element; and a stop, wherein at lest two lens elements including said first lens element have maximum refractive indices of 1.6, and said third lens element satisfies the following conditions:

$0.37 \leq f_3/f \leq 0.41$ $0.29 \leq r_5/f \leq 0.39$ wherein the reference symbol $f_3$ represents a focal length of said third lens element, the reference symbol $r_5$ designates a radius of curvature on an object side surface of said third lens element and the reference symbol f denotes a focal length of said photographic lens system as a whole.

2. A photographic lens system comprising, in order from the object side:

a first lens element which is a positive meniscus lens element having a convex surface on the object side;

a second lens element which is a biconcave lens element;

a third lens element which is a biconvex lens element; and a stop, wherein at least two lens elements including said first lens element have maximum refractive indices of 1.6, and said third lens element satisfies the following conditions (5) and (6):

$0.33 < f_3/f < 0.45$ \hfill (5)

$0.24 < r_5/f < 0.41$ \hfill (6)

wherein the reference symbol $f_3$ represents a focal length of said third lens element, the reference symbol $r_5$ designates a radius of curvature on an object side surface of said lens element and the reference symbol f denotes a focal length of said photographic lens system as a whole.

3. A photographic lens system according to claim 1 or 2 wherein at least two lens elements including said second lens element are made of a synthetic resin material.

4. A photographic lens system according to claim 1 or 2 wherein said first lens element comprises an aspherical surface.

5. A photographic lens system according to claim 1 or 2 wherein said third lens element satisfies the following condition (4):

$$1.50 < n_3 < 1.70 \tag{4}$$

wherein the reference symbol $n_3$ represents a refractive index of said third lens element.

6. A photographic lens system comprising, in order from the object side:

a first lens element which is a positive meniscus lens element having a convex surface on the object side;

a second lens element which is a biconcave lens element;

a third lens element which is a biconvex lens element; and a stop, wherein at least two lens elements including said first lens element have maximum refractive indices of 1.6, and said third lens element satisfies the following conditions (1) and (2):

$$0.20 < f_3/f < 0.45 \tag{1}$$

$$0.24 < r_5/f < 0.45 \tag{2}$$

wherein the reference symbol $f_3$ represents a focal length of said third lens element, the reference symbol $r_5$ designates a radius of curvature on an object side surface of said third lens element and the reference symbol f denotes a focal length of said photographic lens system as a whole; and said first lens element satisfies the following condition (3):

$$0.37 < (r_2 - r_1)/(r_2 + r_1) < 0.65 \tag{3}$$

wherein the reference symbols $r_1$ and $r_2$ represent radii of curvature on an object side surface and an image side surface respectively of said first lens element.

7. A photographic lens system comprising, in order from the object side:

a first lens element which is a positive meniscus lens element having a convex surface on the object side;

a second lens element which is a biconcave lens element;

a third lens element which is a biconvex lens element; and a stop, wherein at least two lens elements including said first lens element have maximum refractive indices of 1.6, and said third lens element satisfies the following conditions (5) and (6):

$$0.33 < f_3/f < 0.45 \tag{5}$$

$$0.24 < r_5/f < 0.41 \tag{6}$$

wherein the reference symbol $f_3$ represents a focal length of said third lens element, the reference symbol $r_5$ designates a radius of curvature on an object side surface of said third lens element and the reference symbol f denotes a focal length of said photographic lens system as a whole, and said first lens element satisfies the following condition (3):

$$0.37 < (r_2 - r_1)/(r_2 + r_1) < 0.65 \tag{3}$$

wherein the reference symbols $r_1$ and $r_2$ represent radii of curvature on an object side surface and an image side surface respectively of said first lens element.

* * * * *